Figure 1:
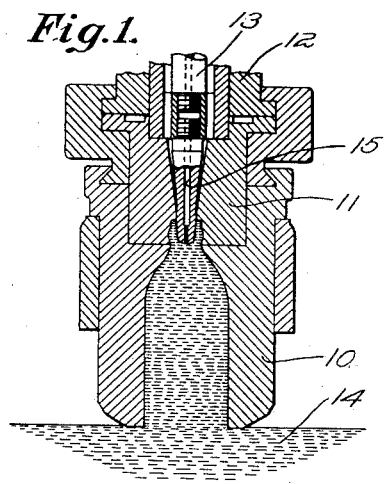

Aug. 4, 1942.    R. W. CANFIELD ET AL    2,292,048
METHOD OF FORMING ARTICLES OF HOLLOW GLASSWARE
Filed May 19, 1939    2 Sheets-Sheet 1

Inventors:
Thomas Waugh
Robert W. Canfield
by Brown & Pailam
Attorneys.

Witness:
A. A. Horn

Aug. 4, 1942.    R. W. CANFIELD ET AL    2,292,048
METHOD OF FORMING ARTICLES OF HOLLOW GLASSWARE
Filed May 19, 1939    2 Sheets-Sheet 2

Witness:
A. A. Horn

Inventors:
Thomas Waugh
Robert W. Canfield
by Brown & Parham
Attorneys.

Patented Aug. 4, 1942

2,292,048

UNITED STATES PATENT OFFICE 2,292,048

METHOD OF FORMING ARTICLES OF HOLLOW GLASSWARE

Robert W. Canfield and Thomas Waugh, West Hartford, Conn., assignors to Hartford-Empire Company, Hartford, Conn., a corporation of Delaware Application May 19, 1939, Serial No. 274,570

3 Claims. (Cl. 49—80)

This invention relates to the manufacture of articles of glassware, such as bottles and other containers, by the fill and empty method.

According to the fill and empty method, a hollow glass parison is formed by charging a mold with glass and thereafter expelling or emptying a predetermined amount of glass in the mold from the interior thereof so as to leave in the mold a hollow body contiguous to the mold walls and closed at the bottom end thereof. The present invention relates more particularly to a fill and empty method of the type that is characterized by the use of suction or a partial vacuum in the interior of the mold to charge such mold with glass from the surface of a supply pool, as, for example, in the use of the apparatus of our Patent No. 2,106,546, granted January 25, 1938, for Apparatus for forming glassware.

An object of the present invention is to provide a novel fill and empty method of the type above described for forming a bottle or other article of glassware to have walls of substantially uniform thickness which can be predetermined and controlled to obviate undesirable thickness at any part of the article.

Another object of the invention is to provide a novel fill and empty method of the type described by which an improved control of the distribution of glass throughout the walls of the final article is obtained.

A further object of the invention is the provision of a novel fill and empty method of the type described for forming bottles or other hollow articles so that the weight of each such article can be accurately predetermined and controlled.

A still further object of the invention is to provide a fill and empty method of the type described by which a bottle or other article of hollow glassware of a predetermined weight and having walls of substantially uniform controlled thickness can be formed by the use of a single mold unit, i. e., a mold unit of which the parts that are employed to give a desirable external shape to a glass parison that is produced in the performance of the method also are employed in forming such parison into an article of the final shape desired.

Figure 2:
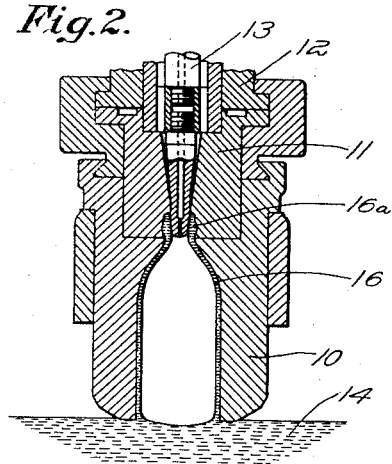
Figure 3:
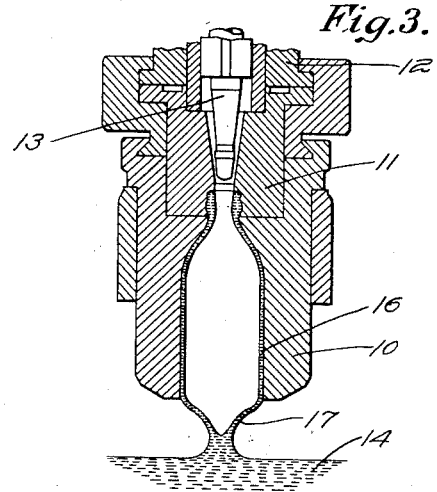
Figure 4:
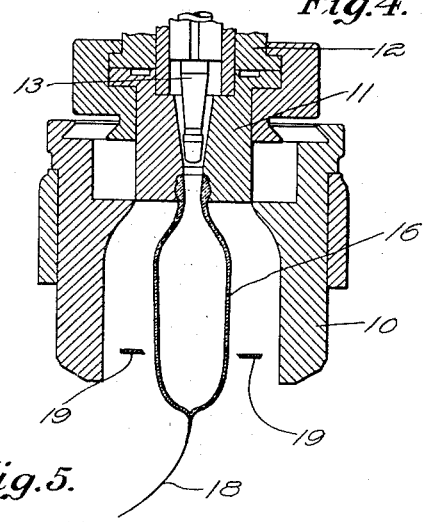
Figure 5:
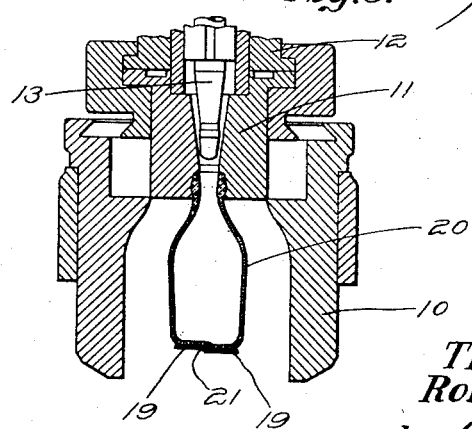
Figure 6:
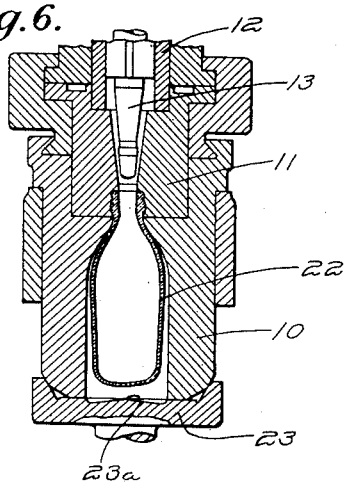
Figure 7:
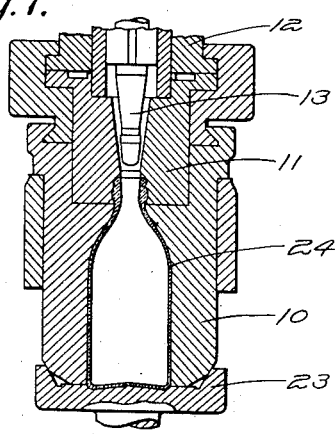

Other objects and advantages of the invention will hereinafter be pointed out or will become apparent from the following description of different means for and ways of carrying out the invention, as illustrated in part in the accompanying drawings, in which:

Fig. 1 is a fragmentary vertical sectional view showing a glass gathering and parison forming structure at the surface of a supply pool of molten glass, the view showing the cavity of such structure filled with glass, Fig. 2 is a similar view of the same structure after a predetermined part of the gathered glass has been expelled or emptied from the interior thereof back into the supply pool, Fig. 3 is a similar view of the same structure at a subsequent stage in the operations to produce a hollow parison of the desired shape, size and physical characteristics, Fig. 4 is a similar view at a later stage in the operations referred to, showing the sections of the suction body mold of the structure of the preceding views in open positions and a hollow glass body or parison suspended by its neck portion from the overhead neck ring of such structure and also showing blades of a shearing mechanism in position to be closed to cut through such hollow glass body or parison, Fig. 5 is a similar view showing the hollow glass body or parison that is obtained by the closing of the shear blades, Fig. 6 is a similar view at a later stage in the operations, showing the mold unit completed by the addition of a bottom plate thereto, the halves of the body mold closed and the hollow glass body or parison suspended within the closed mold unit, and Fig. 7 is a similar view showing the finally blown article in the mold unit.

Referring now more particularly to the drawings, apparatus suitable for use in carrying out the invention may comprise a suction body mold 10, having an internal length which may be nearly as great as or not substantially different from that desired for the body of the final article being made, a sectional neck ring 11 and an associate head 12 in which an axially movable neck pin or plunger 13 is mounted. Suitable passages (not shown) may be provided in the walls of or between the sections of the neck ring and of the body mold and connected in any suitable known way with a suitable source of sub-atmospheric pressure (not shown) so that the cavity of the glass gathering and parison forming structure that comprises the closed body mold and closed associate neck ring may be filled with glass from a supply pool 14 when the assembled parts are at a glass gathering position at the surface of such pool, as shown in Fig. 1. The structure and operation described so far are well known in the art of gathering charges from a supply pool in an open-bottomed suction receptacle as are suitable mechanisms for supporting and operatively moving the several movable parts of the structure shown in Fig. 1. Any preferred known supporting and operating mechanism may be used.

The neck pin or plunger 13 may be provided with a central bore or passage 15 which is adapted for connection with any suitable source of pressure fluid supply, such as compressed air. By the use of such pressure fluid, applied to the relatively soft and fluid glass at the interior of the charge in the cavity of the combined body mold and neck ring, a predetermined amount of such relatively fluid glass may be expelled from such cavity, back into the supply pool, leaving in such cavity a hollow glass body or shell 16 having a neck finish portion 16a, as shown in Fig. 2. This may be done before the mold has been lifted from its glass gathering position at the surface of the supply pool, as shown, or after the glass gathering structure has been lifted from the surface of the supply pool and is being moved away from such glass gathering position.

As shown in Fig. 3, the hollow glass body or parison 16 is closed at its bottom end, as at 17, by the glass which connects such hollow glass body or parison with the glass of the supply pool. This connecting glass may be drawn out to a thin thread or tail, as at 18, next to the bottom end of the hollow parison 16 as such parison is carried upward or away from the place at which glass was gathered from the pool. The neck pin may be retracted to permit reheating of the internal portion of the neck finish portion of the parison and sub-atmospheric pressure on the exterior of the parison may be continued if desired or required to keep such parison in close contact with the walls of the cavity of the glass gathering and parison forming structure.

At a predetermined suitable time, the halves of the body mold 10 may be opened to permit reheating of the walls of the suspended parison and downward elongation thereof under the action of gravity. Some glass may run down the inner surface of the parison body. Also, as shown more or less diagrammatically in Fig. 4, the opening of the halves of the body mold provides space for the operation of shear blades, indicated at 19, which may be closed after a suitable time has elapsed at a predetermined suitable height above the plane of the bottom end of the parison to cut off a predetermined suitable lower or bottom end portion of such parison.

After the severing operation, a hollow glass body or parison of considerably less length than the length of the body mold will be suspended between the open halves of the body mold, as indicated at 20 in Fig. 5, this body or parison having a substantially flat bottom, indicated at 21, which has been formed by the glass constricting and welding action of the shear blades as they are closed. The thickness of this bottom may be increased by glass running down the interior of the side walls of the article. The halves of the body mold may be kept open until the walls of the parison 20 have reheated and elongated sufficiently to provide a parison of the desired size, shape and character.

One such parison is indicated at 22 in Fig. 6 in which such parison is shown suspended within a complete mold unit which includes a bottom plate 23 having a shallow cavity 23a in addition to the closed body mold and neck ring, substantially as shown in Fig. 6. Air under pressure may be applied, at the proper time, as through the neck pin 13, to the interior of this hollow parison to expand such parison to the shape of the article desired, as to form the bottle indicated at 24 in Fig. 7.

In the use of the series of steps herein described or any other steps employed in carrying out the invention, the finally blown article may be removed from the complete mold unit at the prpoer time in any suitable known manner.

It will be noted that in the hereinbefore described illustrative series of steps, the halves of the body mold are opened after the formation of the hollow glass body or parison to leave such hollow glass body or parison suspended in air by its neck portion. This permits reheating and elongation of the walls of the suspended hollow parison while more or less glass may run down the interior thereof.

This novel feature of the invention is important in conjunction with other cooperative steps of the method in effecting predetermination and control of the final distribution throughout the walls of the finally formed article of the glass used in the formation of such article. Such feature also permits a lower or bottom end portion of the hollow parison of predetermined length to be cut away and discarded when such parison has been formed in a substantially full length body mold, a new bottom of course being formed thereon by the severing means. Thus, whether a relatively short body mold or a substantially full length body mold be employed, the ultimate hollow parison is advantageously short at the beginning of a parison reheating and elongating period. It thus is possible to obtain an article having walls of uniform thickness and of a thickness desirably slight or limited in extent at any part of the article and to do this without the necessity of employing a separate final blow mold, although, of course, the invention may be carried out with good results by the use of a structure which includes such a separate final blow mold.

In the foregoing specification and in certain of the appended claims, the term "full length body mold" or equivalent expression refers to a body mold which has an internal length substantially the same as or not substantially less than the length of a side wall of the body of the article to be made so that substantially the entire body of such article will be given its external shape by the walls of the body mold.

We wish it to be understood that we do not desire to be limited to the exact details of construction shown and described, for obvious modifications will occur to a person skilled in the art.

What we claim is:

1. The method of forming an article of hollow glassware which comprises gathering a glass charge in a neck mold and an openable body mold by suction on the surface of a gathering pool, expelling sufficient glass from the interior of the gathered charge to leave a hollow glass body, opening the body mold, cutting through said hollow glass body at a predetermined distance above the plane of the lower end of the body mold to form a shorter parison having a closed bottom, permitting said shorter parison to reheat and elongate for a substantial period while said body mold remains open, closing said body mold and supplementing it with a bottom plate to form a complete mold unit enclosing said parison, and thereafter blowing said parison to form the final article in said mold unit.

2. The method of forming an article of hollow glassware which comprises gathering a glass charge in a neck mold and an openable body mold by suction on the surface of a gathering pool, expelling sufficient glass from the interior of the gathered charge to leave a hollow glass body having a length greater than that of the final article desired, opening the body mold, cutting off a lower end portion of the hollow body of a predetermined length to provide a shorter parison having a closed bottom and a length substantially less than that of the combined cavities of the neck and body molds, permitting said shorter parison to reheat and elongate for a substantial period while the body mold remains open, then closing the body mold and supplementing said body mold with a bottom plate to form a complete mold unit enclosing said parison, and blowing said parison in said mold unit to form the final article desired.

3. The method of forming an article of hollow glassware which comprises gathering a glass charge in a neck mold and a substantially full length openable body mold by suction on the surface of a gathering pool, expelling sufficient glass from the interior of the gathered charge to leave a hollow body having a length substantially greater than that of the final article desired, opening the body mold and cutting off a lower end portion of the hollow glass body of predetermined length to leave a shorter hollow parison having a closed bottom and a length substantially less than that of the combined cavities of the neck and body molds, closing the body mold and supplementing it by a bottom plate to form a mold unit completely enclosing said hollow parison, and blowing said hollow parison in said mold unit to form the final article desired.

ROBERT W. CANFIELD.
THOMAS WAUGH.